US005988533A

United States Patent [19]

Augustin

[11] Patent Number: 5,988,533

[45] Date of Patent: Nov. 23, 1999

[54] MAGNETIC VALVE CONTROLLED FUEL INJECTOR

[75] Inventor: Ulrich Augustin, Kernen, Germany

[73] Assignee: Daimler Chryser AG, Stuttgart, Germany

[21] Appl. No.: 09/064,380

[22] Filed: Apr. 22, 1998

[30] Foreign Application Priority Data

Apr. 25, 1997 [DE] Germany ........................... 197 17 419

[51] Int. Cl.$^{6}$ ............................... B05B 1/30; F16K 31/12

[52] U.S. Cl. ............................................ 239/585.1; 251/52

[58] Field of Search .............................. 239/585.1, 533.8, 239/533.1; 251/47, 52; 123/198 D

[56] References Cited

U.S. PATENT DOCUMENTS

| | | | |
|---|---|---|---|
| 3,481,542 | 12/1969 | Huber | 239/533.8 |
| 4,687,136 | 8/1987 | Ozu et al. | 239/533.8 |
| 5,109,822 | 5/1992 | Martin | 123/456 |

FOREIGN PATENT DOCUMENTS 196 12 738 10/1996 Germany .

*Primary Examiner*—Andres Kashnikow
*Assistant Examiner*—Davis Hwu
*Attorney, Agent, or Firm*—Kraus J. Bach

[57] ABSTRACT

In a magnetic valve controlled fuel injector for a multi-cylinder internal combustion engine with a nozzle needle movably disposed in the injector housing and spring-biased onto a nozzle needle seat wherein high pressure fuel supplied to the nozzle needle through a fuel admission passage lifts the nozzle needle off its seat for discharging fuel therefrom, a control piston with a valve portion is disposed in the injector housing and controlled by an electromagnetic valve for admitting fuel under pressure to the fuel admission passage and a pressure piston is movably disposed in a pressure space formed at one end of a space receiving the nozzle needle spring which, with one end biases the nozzle needle toward its closed position and is supported at its other end by the pressure piston and a throttled communication passage extends between the fuel admission passage and the pressure space for moving the pressure piston toward the nozzle needle when the pressure in the fuel admission passage remains because of a defect in the injector so as to move the nozzle needle onto the nozzle needle seat to interrupt the fuel discharge from the injector.

6 Claims, 1 Drawing Sheet

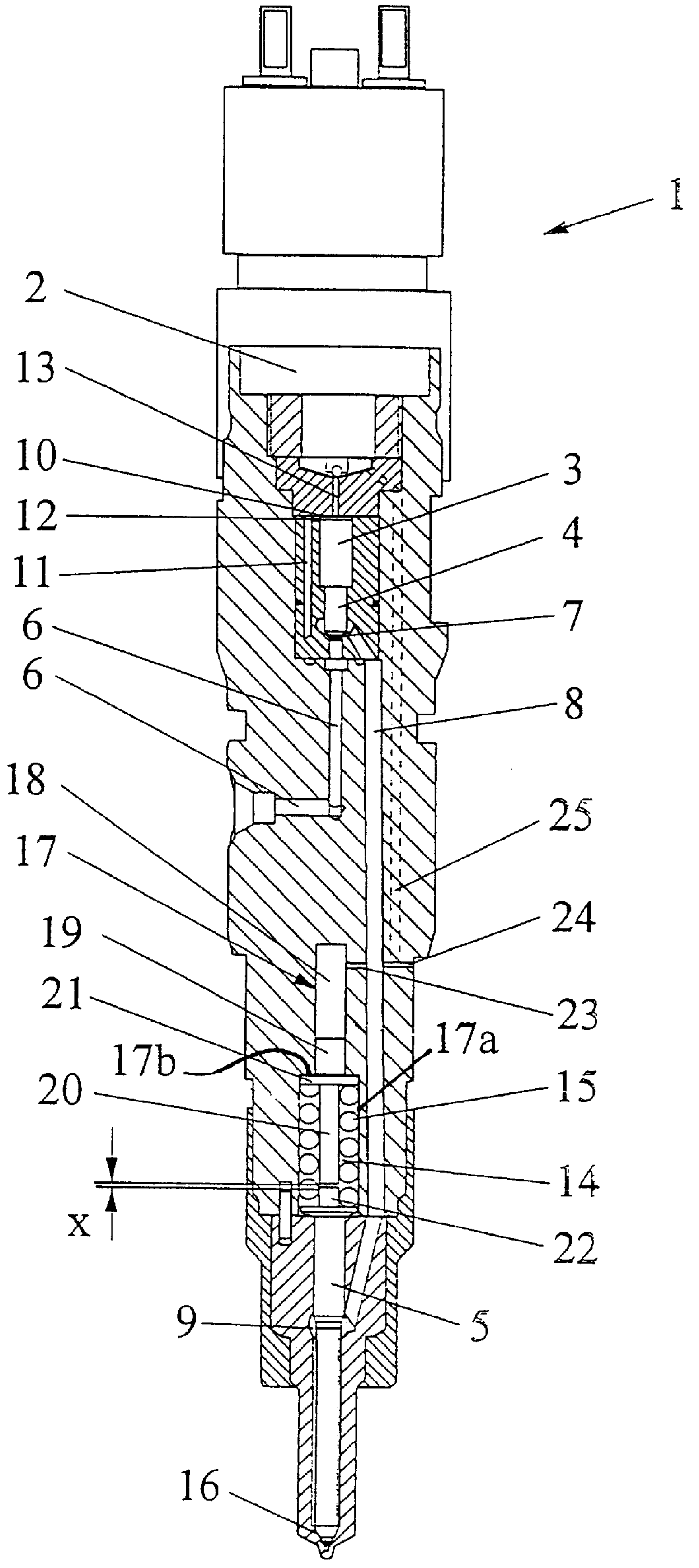
1
2
13
10
12
11
6
6
18
17
19
21
17b
20
x
9
16
3
4
7
8
25
24
23
17a
15
14
22
5

MAGNETIC VALVE CONTROLLED FUEL INJECTOR

BACKGROUND OF THE INVENTION

The invention relates to a magnetic valve controlled fuel injector for direct fuel injection into a combustion chamber of an internal combustion engine wherein the injector includes a nozzle with a spring-loaded nozzle needle and a control piston with a valve structure at one end for blocking the fuel supply to the nozzle and the control piston is exposed at its other end to the pressure of the fuel in a control space and a magnetic valve by which the control space can be placed into communication with a drain line and open the fuel supply line which leads to the nozzle.

A fuel injection system including such an injector is disclosed in DE 196 12 738 A1, wherein a magnetic valve-controlled control piston of the direct injection fuel injector is in communication with the back side of the spring-loaded nozzle needle. The control piston delimits a control space, which can be connected to the fuel drain line so that, by energizing the magnetic valve, the pressure is released from the control space. When the pressure is released from the control space, the control piston opens a valve whereby the fuel supply line is placed into communication with the nozzle needle.

When such fuel injectors become defective, either by a jamming of the control piston or by a disabled magnetic valve, the high pressure fuel supply line may remain in communication with the injection nozzle which may result in engine damage.

Furthermore, U.S. Pat. No. 5,109,822 discloses a common rail fuel injection system with a direct injection fuel injection valve including a piston which is arranged co-axially with the nozzle needle and which is exposed to the high fuel pressure in the system and acts on the nozzle needle. The piston force causes a rapid closing of the nozzle needle during normal operation.

It is the object of the present invention to provide a high pressure fuel injector with which, by simple measures, engine damage is prevented if the injector becomes defective. In addition, emergency engine operation should still be possible inspite of an injector being defective.

SUMMARY OF THE INVENTION

In a magnetic valve controlled fuel injector for a multi-cylinder internal combustion engine with a nozzle needle movably disposed in the injector housing and spring-biased onto a nozzle needle seat wherein high pressure fuel supplied to the nozzle needle through a fuel admission passage lifts the nozzle needle off its seat for discharging fuel therefrom, a control piston with a valve portion is disposed in the injector housing and controlled by an electromagnetic valve for admitting fuel under pressure to the fuel admission passage and a pressure piston is movably disposed in a pressure space formed at one end of a space receiving the nozzle needle spring which, with one end biases the nozzle needle toward its closed position and is supported at its other end by the pressure piston and a throttled communication passage extends between the fuel admission passage and the pressure space for moving the pressure piston toward the nozzle needle when the pressure in the fuel admission passage remains because of a defect in the injector so as to move the nozzle needle onto the nozzle needle seat to interrupt the fuel discharge from the injector.

With the particular arrangement of the piston exposed to system pressure in a pressure space which is separated from the spring space, it is possible to limit the maximum injection fuel volume if the valve becomes defective so that engine damage is prevented. Also, the valve remains closed so that the engine can continue to run on the remaining operative cylinders.

The invention will be described in greater detail below on the basis of the accompanying drawing.

BRIEF DESCRIPTION OF THE DRAWING

The sole FIGURE is an axial cross-sectional view of a fuel injection valve in accordance with the invention.

DESCRIPTION OF A PREFERRED EMBODIMENT

A magnetic valve-controlled direct injection fuel injection valve 1 (which will be called injector) for a common-rail fuel injection system of a multi-cylinder internal combustion engine (not shown) comprises a magnetic valve 2 arranged in the top portion of the injector 1, a control piston 3 which is disposed below the magnetic valve 2 and includes a valve piston 4, and a spring-loaded nozzle needle 5 controlling the fuel ejection from the injector 1.

A fuel supply passage 6 leads to an annular space 7, which surrounds the valve piston 4, and from which a fuel admission passage 8 extends to the nozzle needle 5. During an interval between injections the valve piston 4 keeps the fuel supply passage 6 closed so that the fuel flow from the fuel supply passage 6 to the fuel admission passage 8 and to the pressure space 9 surrounding the nozzle needle 5 is interrupted.

The control piston 3 delimits a control space 10, which is exposed to the fuel system pressure by way of a passage 11 including a fuel admission throttle 12. A pressure relief passage 13 extends from the control space 10 to a drain line 25. The pressure relief passage 13 is normally closed by the magnetic valve 2, but is opened upon energization of the magnetic valve 2.

The nozzle needle 5 is pressed onto the needle seat 16 by a nozzle needle spring 15 disposed in the spring space 14. The spring space 14 is formed by an increased-diameter portion 17*a* of a stepped bore 17. The smaller diameter portion delimits a pressure space 18 in which a piston 19 is axially movably supported. The piston 19 is provided with a nozzle needle engagement pin 20 extending into the spring space 14. The piston 19 is somewhat larger in diameter than the needle engagement pin 20. The needle engagement pin 20 is provided with a shoulder 21 for supporting the nozzle needle spring 15. During proper operation of the fuel injector 1, the shoulder 21 abuts the transition 17*b* between the smaller and the larger diameter portions of the stepped bore 17. At its end within the spring space 14, the nozzle needle 5 is provided with a flanged support structure 22 which engages the nozzle needle 5 or is integrally formed therewith on which the nozzle needle spring 15 is seated.

As a result, the nozzle needle spring 15 engages at one end the nozzle needle 5 so as to hold the nozzle needle 5 seated on its needle seat 16 and, at the other end, the needle engagement pin 20 so as to hold it seated on the transition area 17*b*. In these positions, there is a predetermined gap X between the nozzle needle engagement pin 20 and the nozzle needle 5, which corresponds at least to the maximum opening stroke of the nozzle needle 5.

The pressure space 18 receiving the piston 19 and the fuel admission passage 8 leading to the nozzle needle 5 are in communication by a transverse bore 23 forming a throttling passage.

A throttling passage 24 extends from the fuel admission passage 8 providing for a communication path to the lower pressure side of the fuel injection system, that is, to a drain line.

The throttling passage 24 and the throttling transverse bore 23 are arranged in axial alignment for manufacturing reasons and intersect the fuel admission passage 8. As a result, the bores 23 and 24 can be drilled through the housing of the fuel injector up to the pressure space 18 in a single step. A drain line 25 also leads to the passage 24 so that fuel can be released through the drain line 25 from the control space 10 when the magnetic valve 2 is opened.

Operation of the fuel injection valve when it becomes defective such that system pressure is always applied to the fuel admission line 8.

If, after a normal fuel injection, a defect occurs for example by jamming of the control piston 2, whereby the nozzle needle 5 is kept in its open position, the pressure in the pressure space 18 is gradually increased by fuel entering through the throttled transverse bore 23. As soon as the pressure in the pressure space 18 reaches a value which, multiplied by the surface of the piston 19, equals the product of the system pressure and the nozzle needle surface subjected to the fuel pressure, the nozzle needle 5 is in a force equilibrium and, with a further increasing pressure in the pressure space 18, is moved to a closed position by the nozzle needle engagement pin 20 engaging the nozzle needle 5.

During this period, the amount of fuel entering the pressure space 18 is proportional to the amount of fuel discharged through the nozzle openings. Consequently, the maximum fuel flow volume after which the nozzle needle is automatically moved to a closed position is independent of the system pressure.

After the nozzle needle 5 is automatically closed, the defective injector is shut down as the pressure in the pressure space 18 remains at the pressure of fuel supply system. An emergency operating capability of the engine, however, is maintained as the engine can be operated with the cylinders served by the properly operating fuel injectors of a multi-cylinder internal combustion engine.

What is claimed is:

1. A magnetic valve-controlled fuel injector for a multi-cylinder internal combustion engine with direct fuel injection, said injector having a housing including a nozzle needle with a nozzle needle seat, a spring engaging with one end said nozzle needle so as to bias said nozzle needle onto said nozzle needle seat to close said fuel injection nozzle, a control piston movably disposed in said housing and having at one end a valve portion for controlling the admission of high pressure fuel to a fuel admission passage leading to said nozzle needle and a control space being provided at the other end of said control piston, an electromagnetic valve arranged adjacent the other end of said control piston for controlling a communication path between said control space and a fuel drain passage whereby, upon energization of said electromagnetic valve, fuel pressure in said control space can be released such that said control piston permits the supply of high pressure fuel to said fuel admission passage and to said fuel nozzle needle, a pressure piston movably disposed in a pressure space formed at the other end of said spring, with the other end of said spring being seated on said piston, and a throttled communication passage extending between said fuel admission passage and said pressure space to permit limited fuel flow to said pressure space so as to increase the pressure in said pressure space when the pressure in said fuel admission passage remains over a certain period of time thereby moving said pressure piston toward said nozzle needle for closing said nozzle needle valve.

2. A fuel injection nozzle according to claim 1, wherein said throttled communication passage is a transverse bore extending between said fuel admission passage and said pressure space.

3. A fuel injection nozzle according to claim 1, wherein said pressure piston includes an engagement pin extending into the space receiving said spring and having an end face spaced from said nozzle needle by a distance at least as large as the maximum opening stroke of said nozzle needle.

4. A fuel injection nozzle according to claim 3, wherein said nozzle needle spring is a coil spring and said engagement pin extends from said pressure piston into said spring and has a shoulder on which one end of said coil spring is supported, while the other end of said coil spring engages said nozzle needle.

5. A fuel injection nozzle according to claim 1, wherein said nozzle needle has a needle shaft having a diameter smaller than that of said pressure piston.

6. A fuel injection nozzle according to claim 1, wherein a throttling communication passage extends between said fuel admission passage and a drain line and is formed by a bore disposed in axial alignment with said throttled bore extending between said fuel admission passage and said pressure space such that both bores can be formed by drilling a bore intersecting said fuel admission passage.

* * * * *